CLUTE & MARSHALL.
Hand-Seeder.
No. 69,076.  Patented Sept 24, 1867
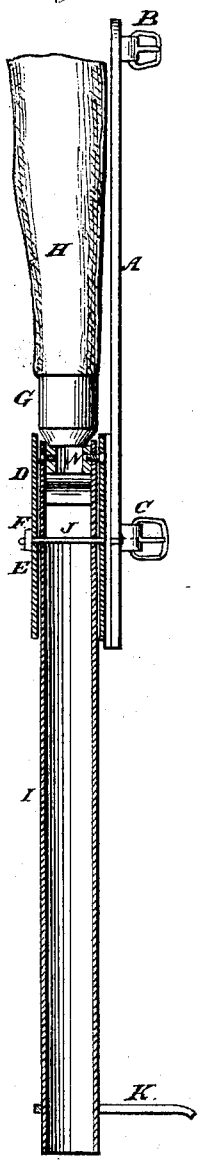
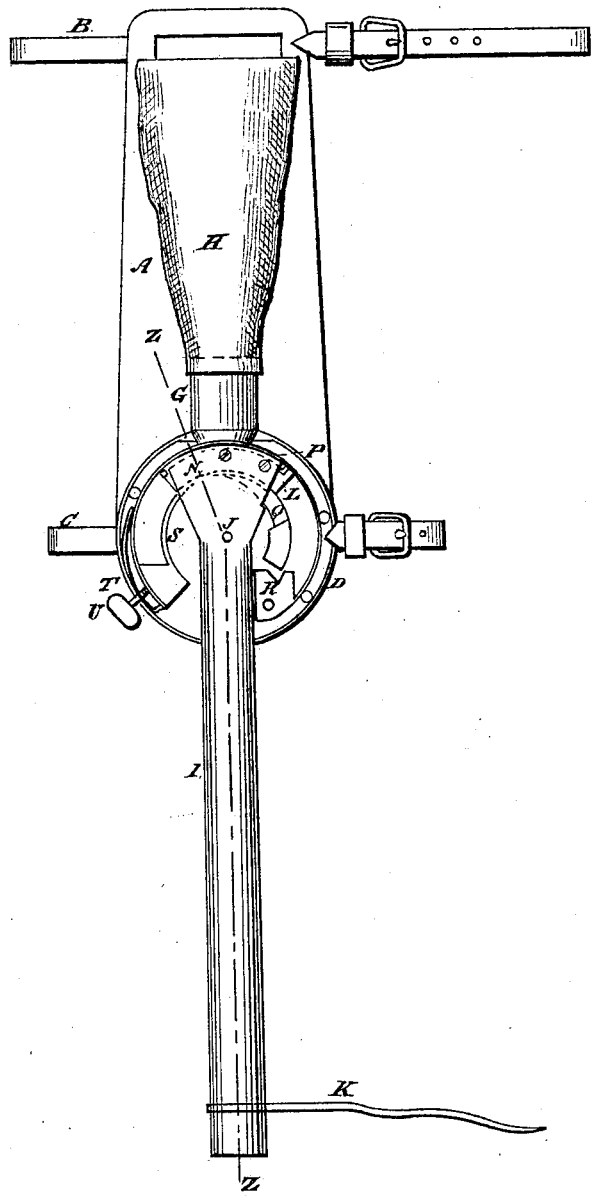
Witnesses:
Wm Denny
J. M. Fowler
Inventor:
Nicholas Clute
& Oliver W. Marshall
By their Atty J. Dennis Jr

United States Patent Office.

NICHOLAS CLUTE, OF SCHENECTADY, NEW YORK, AND OLIVER W. MARSHALL, OF COLUMBUS, OHIO.

*Letters Patent No. 69,076, dated September 24, 1867.*

IMPROVEMENT IN SEED-PLANTERS.

*The Schedule referred to in these Letters Patent and making part of the same.*

TO ALL WHOM IT MAY CONCERN:

Be it known that we, NICHOLAS CLUTE, of Schenectady city and county, State of New York, and OLIVER W. MARSHALL, of Columbus, Franklin county, State of Ohio, have invented a new and useful Leg Seed-Planter; and we do hereby declare the following description and accompanying drawings are sufficient to enable any person skilled in the art or science to which it most nearly appertains to make and use our said invention and improvements without further invention or experiment.

The nature of our invention consists in constructing a corn-planter that may be applied to the leg of a person, so that the vibration of the leg or the bending of the knee in the act of walking will work a lever and operate the segment slides or valves, and deliver the seed to be planted; and in a hollow lever working on a pivot and carrying a perforated segment or slide, to receive and deliver the seed into and through the lever, and drop or plant it as required; and in the use and application of a perforated loose segment or slide between the delivering segment and the tube that supplies the seed; and in a stationary segment under the traversing segment, to stop and hold the seed until the proper time for its delivery; and in a sliding segment, to retain and hold the seed when it is desirable to stop planting. In the accompanying drawings—

Figure 1 is an elevation of our improved planter, with the face-plate of the case removed, to show the interior.

Figure 2 is a section on the line z z of fig. 1.

In these drawings, A is a piece of leather about four inches wide and eighteen inches long, provided with a strap, B, to buckle around the waist of the person using the apparatus, and a strap, C, to buckle around the lower part of the thigh to hold the apparatus on; and it may be provided with a strap to pass over the shoulder, if desired. To the lower end of A a sheet-metal box, D, is fastened, about four inches in diameter and one inch deep, with a cover or face-plate, E, which may be readily removed by taking off the nut F and removing one or more screws. We make an opening in the upper side of the box D about seven-eighths of an inch in diameter, and fasten the tube G to it, and to the top of the tube we fasten the bag H, to hold and supply the corn or seed to be planted. The top of this bag may be supported by a strap over the shoulder or otherwise. We make a tube, I, of sheet metal, about seventeen inches long, in the form shown in the drawing, and arrange it to swing or vibrate on the bolt J in the centre of the box D, as the leg of the user is bent in walking, the lower end of the tube being fastened to the leg by the strap K, below the knee. The upper end of the tube I is made wide, as shown in fig. 1, and has the segment L fastened in it, with a hole, N, through it, as shown by dotted lines in fig. 1. There is a space between the outside of this segment and the box D, for a thin segment, shown by dotted lines in fig. 1. This thin segment, P, is fitted to traverse freely between the segment L and box D, and is perforated, so that when the segment P is against the stop on the left-hand end of the segment L the holes will correspond in the two segments. The segment P can only move about one-third or one-fourth of the diameter of the hole through it, as there is a stop at each end of the segment L. It is found in practice that this loose segment P makes it more sure to deliver the seed, and also saves the seed from being cut between the box and segment, and is a great advantage to the planter. Below the segment L there is a permanent segment, Q, fastened to the box, and extends around under the segment L, as shown by dotted lines, so that when the hole in the segment L is carried under the hole in the box to be filled with seed, the segment Q will stop the seed from falling through; but when the segment L moves the other way, by vibrating the tube, it carries the hole N from under the hole in the box and shuts the seed off, and also carries the hole N from over the segment Q and lets the seed pass down through the tube to the ground. R is a block fastened to the box for the tube to stop against in its vibration. The segment S is connected to the spring T by the screw U, which passes through a slot in the box, so as to move the segment S up to the segment Q and stop the delivery of the seed if the tube is vibrated. This last segment may be made of thin sheet metal, and arranged outside of all the other segments, between them and the box, if preferred that way. If necessary or desirable, the segment P may be provided with springs at one or both ends.

To use this planter it is strapped on the right side and leg, as heretofore described, when the motion of the leg in walking delivers the seed so that it drops by the side of the right foot every time it is put down and the eg straightened in the act of walking, so that the person only has to step the distance required to deposit the seed.

Having described our invention, we claim—

A seed-planter so constructed that when applied to the leg of a person the vibration of the leg, or the bending of the knee in the act of walking, will work the lever and operate the segment slides or valves, and deliver the seed to be planted.

We claim a hollow lever working on a pivot, and carrying a perforated segment or slide to receive and deliver the seed into and through the lever, substantially as described.

And, in combination with the segment above claimed, we claim the perforated loose segment P, between the segment L and the box.

In combination with the delivering segment L, we claim the stationary segment Q, substantially as described.

Also, in combination with delivering segment L, we claim the sliding segment S, for retaining and holding the seed when it is desirable to stop planting.

NICHOLAS CLUTE,
OLIVER W. MARSHALL.

Witnesses to the signature of NICHOLAS CLUTE:
    T. C. CONNOLLY,
    J. DENNIS, Jr.

Witnesses to the signature of OLIVER W. MARSHALL:
    A. CASSIL,
    EDMUND E. BRENT.